March 12, 1957  F. M. CASSON  2,784,514
WEIGHT CONTROLLED NET Filed Nov. 5, 1954  5 Sheets-Sheet 1

Floyd M. Casson
INVENTOR.

BY
*Attorneys*

March 12, 1957

F. M. CASSON 2,784,514

WEIGHT CONTROLLED NET

Filed Nov. 5, 1954

Floyd M. Casson
INVENTOR.

BY *Clarence A. O'Brien*
*and Harvey B. Jacobson*
Attorneys

March 12, 1957 F. M. CASSON 2,784,514
WEIGHT CONTROLLED NET
Filed Nov. 5, 1954 5 Sheets-Sheet 3

Floyd M. Casson
INVENTOR.

BY *Clarence A. O'Brien*
*and Harvey B. Jacobson*
Attorneys

Floyd M. Casson
INVENTOR.

United States Patent Office 2,784,514
Patented Mar. 12, 1957

2,784,514
WEIGHT CONTROLLED NET
Floyd M. Casson, Pottstown, Pa.

Application November 5, 1954, Serial No. 467,186

15 Claims. (Cl. 43—7)

This invention relates in general to new and useful improvements in fishing nets, and more specifically to an improved drop net.

The primary object of this invention is to provide an improved drop net which is so constructed whereby the lower portion thereof is retained in an open state at all times except when it is desired to close the bottom portion of the net in order to trap fish therein.

Another object of this invention is to provide an improved weight which is intended to be mounted along a lower edge of a drop net and have attached thereto a net closing line, the weight being so configurated whereby it and the lower end of the associated net closing line is urged outwardly to effect the retention of the lower portion of the net in an open state.

Another object of this invention is to provide an improved drop net which includes a rigid upper frame having depending therefrom the net proper, the lower portion of the net having connected thereto net closing lines which are in turn connected to a net control ring, the net control ring being slidably mounted on a lifting line attached to the rigid frame and having connected thereto a net control line.

A further object of this invention is to provide an improved drop net construction which includes a rigid frame having depending therefrom a net, net closing lines connected to the lower portion of the net, and a net expanding ring disposed within the lower portion of the net between the net and the lifting lines, the net expanding ring being freely slidable within the net so as to retain the lowermost portion of the net in an expanded state at all times.

A still further object of this invention is to provide an improved drop net assembly which includes a rigid frame having a net depending therefrom, the rigid frame including a tubular member having ribs pivotally connected thereto, a sleeve slidable on the tubular member and having braces for the ribs pivotally connected thereto and to the ribs whereby sliding movement of the sleeve along the tubular member will permit the collapsing or folding of the rigid frame so that the drop net will occupy a minimum of storage space.

Yet another object of this invention is to provide an improved drop net assembly which includes a drop net and a supporting stand, the supporting stand being receivable in an upper portion of the drop net and being intended to support a drop net in its folded state.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
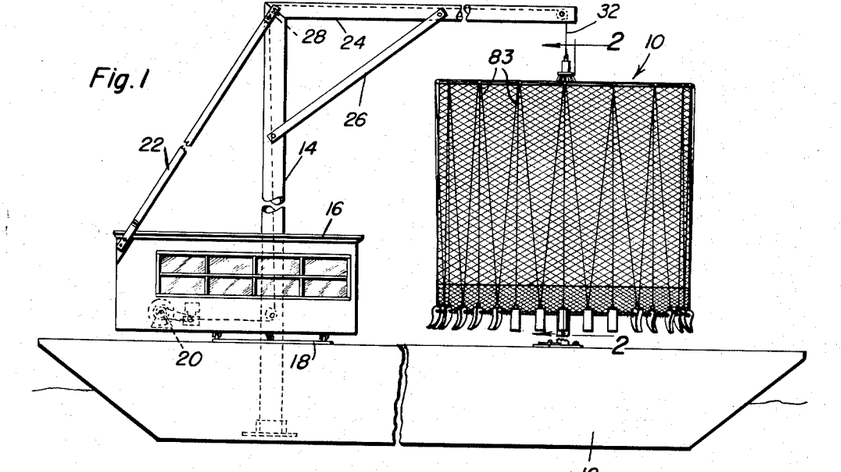
Figure 1 is a side elevational view of a fishing boat and shows the same provided with the drop net which is the subject of this invention, the drop net being illustrated in position aboard the fishing boat and associated with a supporting stand carried by the fishing boat.

Referring now to Figure 1 of the drawings in detail, it will be seen that there is illustrated a fishing boat or fishing barge 12. Carried by the fishing boat 12 is a mast 14 which has incorporated therewith an operator's shack 16, the operator's shack 16 being rotatably mounted on a suitable track 18 carried by the deck of the fishing boat 12. Mounted within the operator's shack 16 is suitable machinery in the form of winches 20 for controlling the operation of lines extending upwardly through the mast 14.

Figure 14:
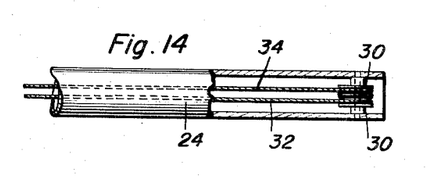
Figure 14 is an enlarged fragmentary top plan view of the outer portion of the boom of Figure 1 for supporting the drop net, portions of the boom being broken away in order to show the arrangement of the lines mounted therein.

The mast 14 is spaced relative to the operator's shack 16 by suitable bracing 22. Carried by the upper end of the mast 14 and extending outwardly therefrom is a boom 24 which is braced relative to the mast 14 by a brace 26. The boom 24 is hollow and has communicated therewith the interior of the mast 14. Lines, described below, which are connected to the winches 20 extend up through the boom over pulleys 28 in the upper part of the mast 14 and through the boom 24. As is best illustrated in Figure 14, there is mounted in the outer end of the boom 24 pulleys 30 which have entrained thereover lines 32 and 34.

Suspended from the boom 24 and connected thereto by the lines 32 and 34 is a drop net which is referred to in general by the reference numeral 10, the drop net being the subject of this invention.

Figure 2:
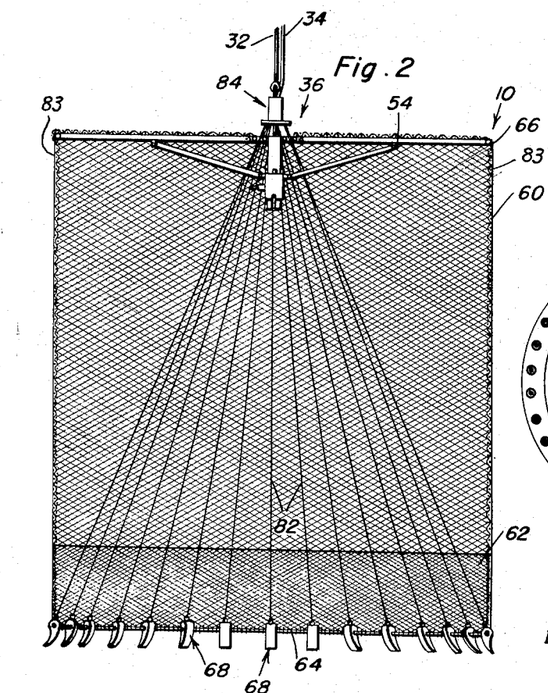
Figure 2 is an enlarged fragmentary vertical sectional view taken substantially upon the plane indicated by the section line 2—2 of Figure 1 and shows the general details of construction of the fishing net of Figure 1 in its dropping position, the supporting stand being omitted for purposes of clarity.
Figures 5, 7, 8, 11:
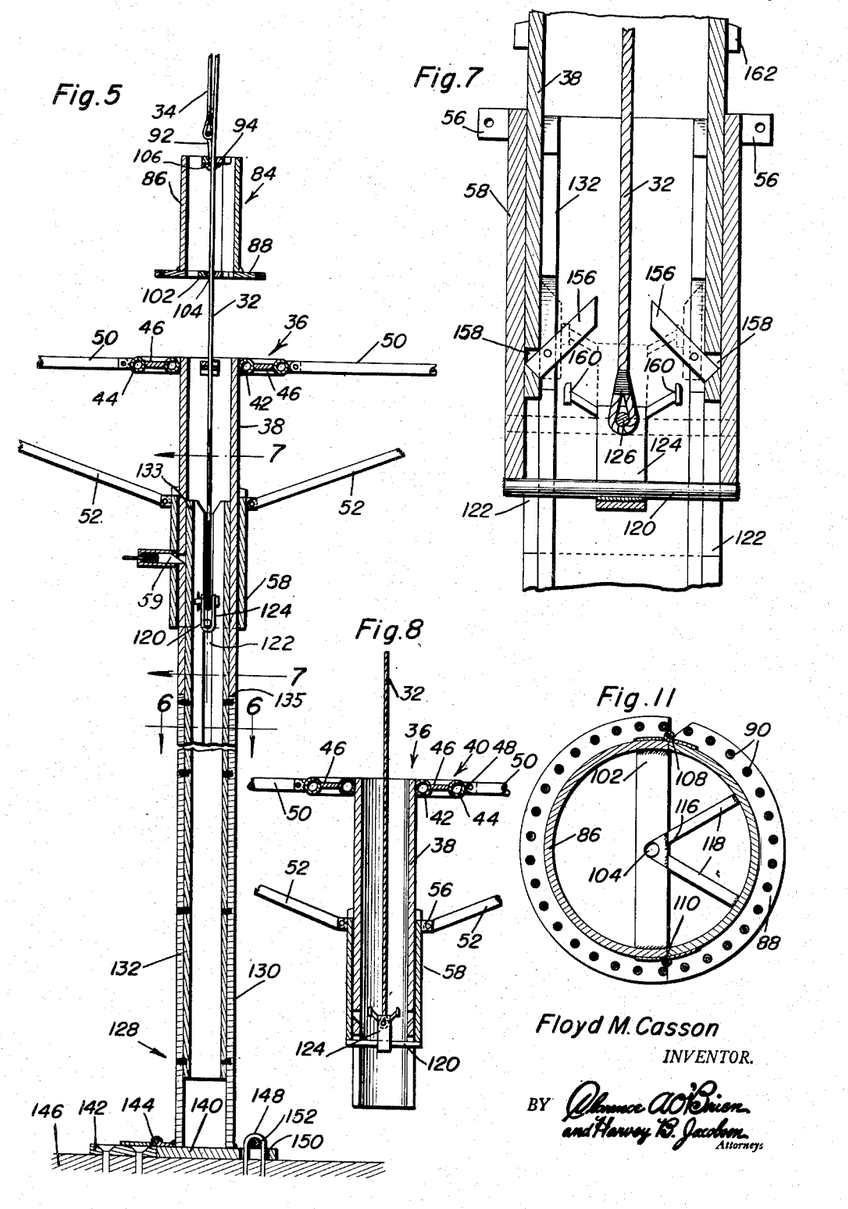
Fig. 5 is an enlarged fragmentary vertical sectional view taken through the drop net when mounted on the supporting stand with the rigid frame thereof in a net supporting position, the net and the net closing lines being omitted for purposes of clarity.
Figure 7 is an enlarged fragmentary vertical sectional view taken substantially on the plane indicated by the section line 7—7 of Figure 5 and shows the manner in which the lower part of the tubular member of the rigid frame of the net is latched to the upper portion of the supporting stand to prevent initial upper movement of the tubular member as the sleeve is slid vertically therealong, also being shown is the means for automatically releasing the latch means securing the tubular member to the upper portion of the supporting stand.
Figure 8 is an enlarged fragmentary vertical sectional view taken through the rigid frame portion of the net and shows the same in an initial state of being engaged with the upper part of a supporting stand.
Figure 11 is an enlarged transverse horizontal sectional view taken substantially on the plane indicated by section line 11—11 of Figure 3 and shows the details of construction of the lower portion of the net control ring.
Figure 6:
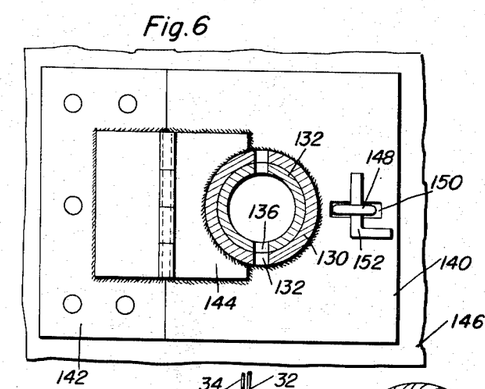
Figure 6 is an enlarged transverse horizontal sectional view taken substantially upon the plane indicated by the section line 6—6 of Figure 5 and shows the general details of the construction of the support stand and the manner in which it is pivotally connected to the deck of the boat.
Figure 9:
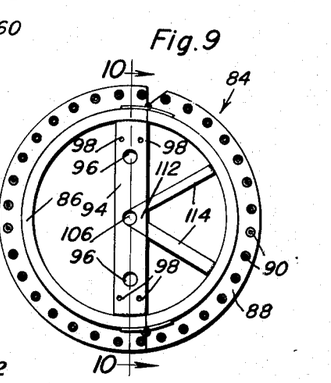
Figure 9 is an enlarged top plan view of the net control ring and shows the arrangement of various parts thereof including the manner in which the halves thereof are hingedly connected together.

As is best illustrated in Figures 2, 5 and 8, the drop net 10 includes a rigid upper frame which is referred to in general by the reference numeral 36. The frame 36 includes a vertically disposed, elongated tubular member 38 which has secured to the upper end thereof an outwardly directed support ring which is referred to in general by the reference numeral 40. The support ring 40 includes an inner ring 42 which is secured directly to the upper end portion of the tubular member 38 and an outer ring 44 which is concentric with respect to the inner ring 42. The rings 42 and 44 are connected together by circumferentially spaced, radiating webs 46.

Pivotally connected to the outer ring 44 by hinges 48 are radiating ribs 50. The ribs 50 are retained in horizontal positions by braces 52 which are pivotally connected to the ribs 50, as at 54. The inner ends of the ribs 52 are pivotally connected, as at 56, to an upper portion of a sleeve 58. The sleeve 58 is slidable on the tubular member 38 and is normally secured thereto by a spring urged latch element 59, as is best illustrated in Figure 5.

Figure 12:
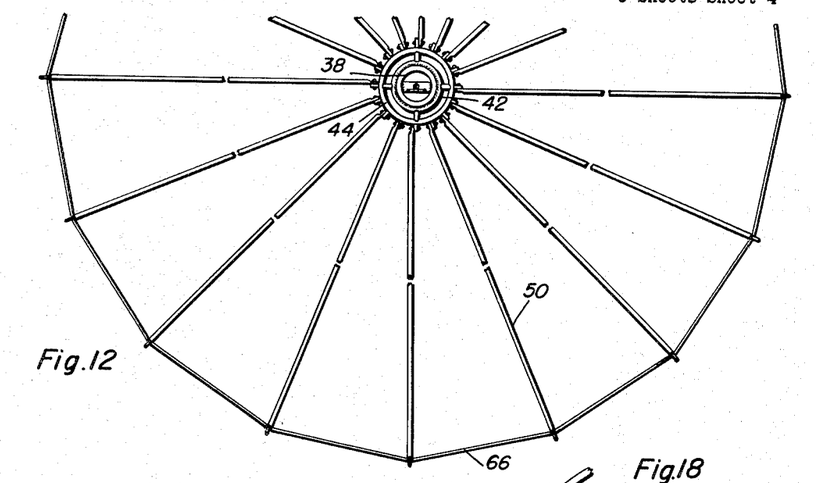
Figure 12 is an enlarged fragmentary top plan view of the drop net of Figure 1 with the net and net closing lines thereof removed and shows the details of the rigid upper frame.

Entrained over the rigid frame 36 and depending therefrom is a net 60. The net 60 overlies the rigid frame 36 as well as depending therefrom. The net 60 includes a lower portion 62 which is of a finer weave. Extending around the lower part of the net 60 is a line 64. The line 64 underlies a line 66 which extends about and is connected to the outer ends of the ribs 50, as is best illustrated in Figure 12.

Figure 15:
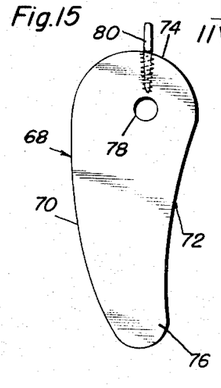
Figure 15 is an enlarged elevational view of one of the weights for controlling the opening of the drop net.

In order to ensure that the lower end of the net 60 remains in an open state when dropped, there is carried by the line 64 a plurality of circumferentially spaced weights 68. As is best illustrated in Figure 15, each of the weights 68 is vertically elongated and has a lower portion of a reduced width as compared to the upper portion. Each of the weights 68 is generally rectangular in cross-section and includes a convex inner surface 70 and a concave outer surface 72. The surfaces 70 and 72 are connected by rounded upper portions 74 and a rounded lower portion or end 76.

Extending transversely through the upper part of each weight 68 is a horizontally disposed bore 78. The bore 78 has received therethrough the line 64 which functions as a pivot for the weight 68. Also carried by the upper end of the weight 68 is an eye 80 for the attachment of a net closing line 82. Also secured to each of the eyes 80 is a weight supporting line 83. The upper ends of the weight supporting lines are attached to the outer ends of the ribs 50 with the lines 83 attached to each rib 50. There is twice as many weights 68 as ribs 50 to be properly supported as is best shown in Figure 1. Each of the weights 68 is so configured and the pull on the lines 82 and 83 is such whereby when the drop net 10 is dropped, each of the weights 68 will have a tendency to move outwardly due to the force exerted by the water on the sloping faces thereof in their passage through the water so as to tension the line 64 and retain the lower part of the net 60 in an open state.

Figure 3:
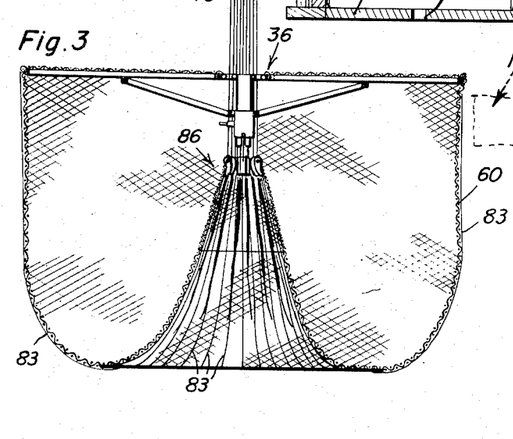
Figure 3 is an enlarged vertical sectional view similar to Figure 2 and shows the drop net in its closed fish trapping position.

In order that the lower part of the net 60 may be selectively closed to trap fish therein, as is best illustrated in Figure 3, there is provided a net control ring which is referred to in general by the reference numeral 84. As is best illustrated in Figures 5, 9, 10 and 11, the net control ring 84 includes an elongated tubular portion 86 which has secured to the lower part thereof an outwardly directed annular flange 88. The flange 88 is provided with a plurality of circumferentially spaced apertures 90 through which are received the upper ends of the net closing lines 82.

Figure 10:
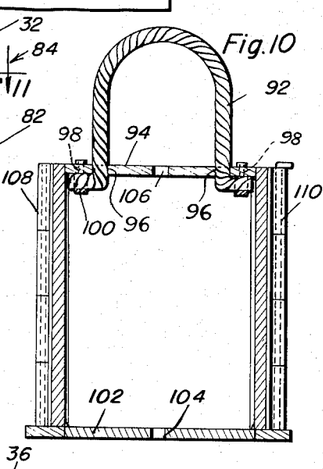
Figure 10 is an enlarged vertical sectional view taken substantially upon the plane indicated by the section line 10—10 of Figure 9 and shows the manner in which a lifting eye is connected to a transverse bar of the net control ring, a lower annular line connecting ring having outer portions thereof broken away.

In order that the net control ring 84 may be selectively raised and lowered, there is connected thereto the line 34. The line 34 is, in turn, connected to an eye forming rope member 92 which is best illustrated in Figure 10. The rope member 92 is carried by a bar 94 which extends diametrically across the upper part of the tubular member 86. The bar 94 is provided adjacent the outer ends thereof with enlarged openings 96 for receiving end portions of the rope member. Disposed adjacent the openings 96 are apertures 98 for receiving threaded elements 100 of clamps for securing the ends of the rope member 92 against the underside of the bar 94.

Disposed immediately below the bar 94 is a similar bar 102. The bar 102 is provided with a central opening 104 aligned vertically with a central opening 106 in the bar 94. The openings 104 and 106 have received therethrough the line 32 which is suitably connected to the rigid frame 36 in a manner to be described in more detail hereinafter. The relationship between the bars 94 and 102 and the line 32 is that of a guided nature.

In order that the net control ring 84 may be disengaged from the line 32, the tubular member 86 as well as the annular flange 88 is formed in split halves. The split halves of the tubular member 86 are connected together by opposed hinges 108 and 110. The hinge 110 includes a removable pin which permits the opening of the tubular member 86.

In order to facilitate the opening of the tubular member 86, the bar 94 is provided adjacent the opening 106 with a generally triangular wedge 112. The triangular wedge 112 has secured thereto suitable struts 114 which in turn are connected from a half of the tubular member 86 opposite to that half to which the bar 94 is connected. A similar triangular wedge 116 is formed in the bar 102 adjacent the opening 104. The wedge 116 is carried by a pair of struts 118. Thus, the line 32 may be conveniently positioned in and removed from the openings 104 and 106 when the tubular member 86 has the halves thereof moved to an open position.

Referring now to Figures 2 and 3, it will be seen that the net closing lines 82 extend down between the rings 4 and 46 in guided relation. Inasmuch as the net closing lines 82 have their lower ends connected to the weights 68, when the net control ring 84 is moved vertically through the use of the net control line 34, the weights 68 and the line 64 will be moved vertically so that the lower part of the net 60 will move together and upwardly to form a trap in trapping the fish disposed within the net 60, as is best illustrated in Figure 3.

Referring now to Figures 7 and 8 in particular, it will be seen that extending transversely across the bottom of the sleeve 58 is a rod 120. The rod 120 is disposed in diametrically opposed vertical slots 122 in the lower portion of the tubular member 38 and opening through the bottom thereof. The rod 120 has secured to the central portion thereof an upwardly disposed U-shaped fitting 124. Extending between upper parts of the fitting 124 is a pin 126 which has connected thereto the lower end of the lifting line 32.

Figure 13:
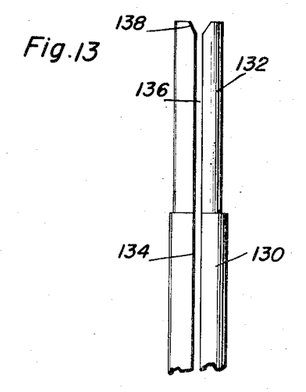
Figure 13 is an enlarged fragmentary elevational view of the upper portion of the supporting stand and shows the general details thereof including the means for receiving the rigid frame of the drop net.

In order that the net 10 may be suitably supported aboard the fishing boat 12, there is provided a supporting stand which is referred to in general by the reference numeral 128. The supporting stand 128 includes an outer tubular member 130 which has secured therein an inner tubular member 132 which has an upper end portion 133. As is best illustrated in Figure 13, the inner tubular member 132 extends above the outer tubular member 130. As is shown in Figure 5, the lower end of the tubular member 132 seats on the tubular member 130 at 135. The tubular members 130 and 132 have disposed therein aligned vertical slots 134 and 136. The vertical slot 136 is provided with an enlarged portion 138 at the upper end of the tubular member 132 to facilitate the entrance of the rod 120 into the vertical slot 136.

The supporting stand 128 also includes a base plate 140 which has secured thereto the lower end of the tubular member 130. The base plate 140 is hingedly connected to a mounting plate 142 by a hinge 144. The mounting plate 142 is suitably secured to the deck 146 of the fishing boat 12. In order that the supporting stand 128 may be normally retained in a vertical position, there is carried by the deck 146 an inverted U-shaped fastener 148 which projects upwardly through the slot 150 in the base plate 140. Selectively inserted through that portion of the fastener 148 extending above the base plate 140 is a locking pin 152 to retain the base plate 140 in a horizontal position abutting the deck 146.

When it is desired to temporarily store the drop net 10, it is swung into an overlying position relative to the supporting stand 128 and lowered down thereover with the upper end portion of the tubular member 132 being received in the lower end of the tubular member 38. As the drop net 10 is lowered, the rod 120 enters into the slot 136 and the drop net 10 moves downwardly until such time as the tubular member 38 seats on the upper end of the tubular member 130.

Referring now to Figure 7 in particular, it will be seen that there is pivotally carried by the upper portion of the tubular member 132 above the upper end of the tubular member 130 a pair of gravity actuated lock members 156. The lock members 156 have their lower ends seatable in recesses 158 in the intermediate part of the tubular member 38. The lock members 156 and the recesses 158 are so positioned that when the tubular member 38 is seated on the upper end of the tubular member 130, the lock members 156 move into the recesses 158 to prevent upward movement of the tubular member 38 with respect to the supporting stand 128.

Once the net 10 has been positioned on the supporting member 128, the rigid frame 36 may be collapsed by moving the latch member 59 to an inoperative position. When this has been accomplished and the lifting line 32 is slacked, the sleeve 58 will slide down off the tubular member 38 and over the tubular member 130. As the sleeve 58 moves downwardly, the braces 52 are also pulled down with the result that the ribs 50 move downwardly and the net 10 is collapsed to its folded state of Figure 4. It is readily apparent from Figure 4 that the net 10 occupies a minimum space when in its folded state.

Figure 4:
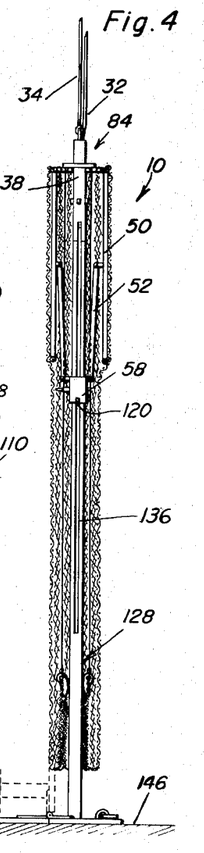
Figure 4 is an enlarged vertical sectional view taken through the drop net of Figure 1 when mounted on the supporting stand and shows the same in a collapsed state, the lower portion of the supporting stand and drop net being shown pivoted to a position lying directly on the deck of the fishing boat by dotted lines.

In event it is desired to further store the drop net 10, the pin 152 may be removed and the supporting stand 120 pivoted to a position overlying the deck 146 so that the drop net 10 will be horizontally disposed overlying the deck 146, as is best illustrated by dotted lines in Figure 4.

Carried by the upper portion of the U-shaped fitting 124 are outwardly projecting trip members 160. The trip members 160 are aligned with the lock members 156 and are engageable therewith to release the lock members 156 from the tubular member 38.

When it is desired to open the drop net 10 from its collapsed or folded state of Figure 4, it is merely necessary to tension the lifting line 32 with the result that the rod 120 pulls the sleeve 58 upwardly back over the lower portion of the tubular member 38. The sleeve 58 moves upwardly over the tubular member 38 until such time as the upper end thereof engages suitable stops 162. At this time, the latch member 59 will become engaged with the tubular member 38 to lock the sleeve 58 to the tubular member 38 to retain the ribs 50 in their extended horizontal positions. Further upward movement of the lifting line 32 will result in the upward movement of the entire drop net 10. As the drop net 10 moves upwardly, the trip members 160 will engage the lock members 156 to move into their inoperative positions so that the entire drop net 10 may then be removed from the supporting stand 128.

Figures 16, 19:
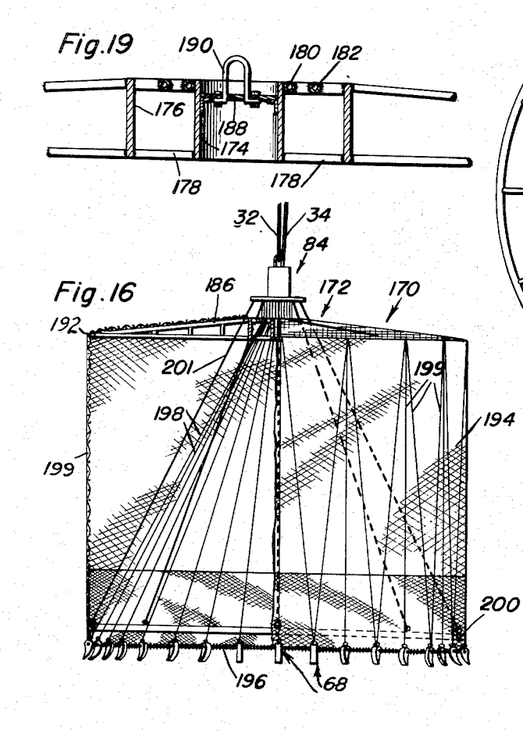
Figure 16 is an enlarged vertical sectional view similar to Figure 2 through a modified form of drop net and shows the general details thereof.
Figure 19 is an enlarged fragmentary vertical sectional view taken substantially upon the plane indicated by the section line 19—19 of Figure 18 and shows the general details of construction of a central portion of the rigid frame of the drop net of Figure 16.
Figures 17, 20:
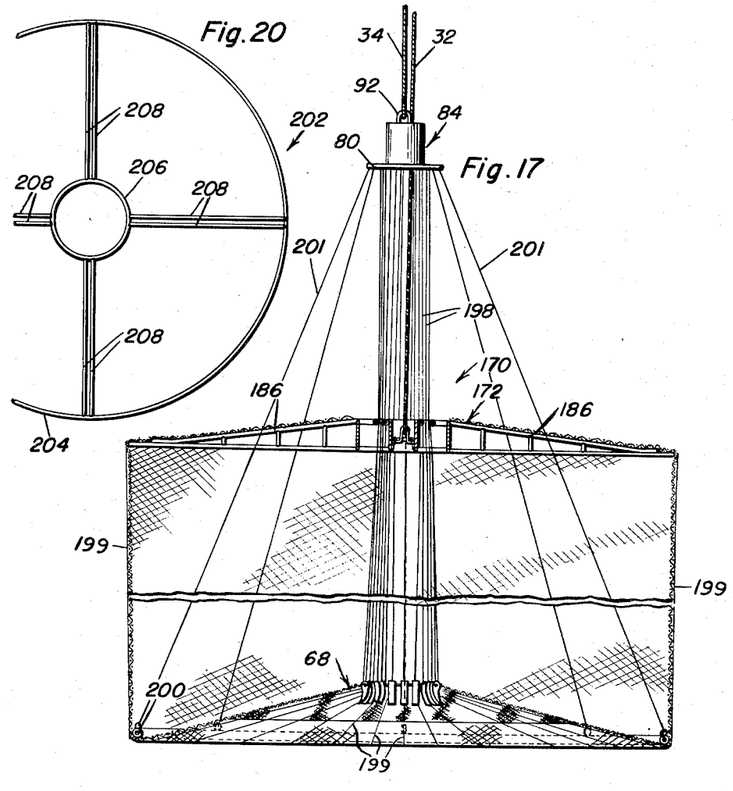
Figure 17 is an enlarged vertical sectional view taken through the center of the drop net of Figure 16 and shows the same in a closed fish trapping position.
Figure 20 is an enlarged fragmentary top plan view of a still further modified form of drop net frame and shows the general details of the construction thereof.
Figure 18:
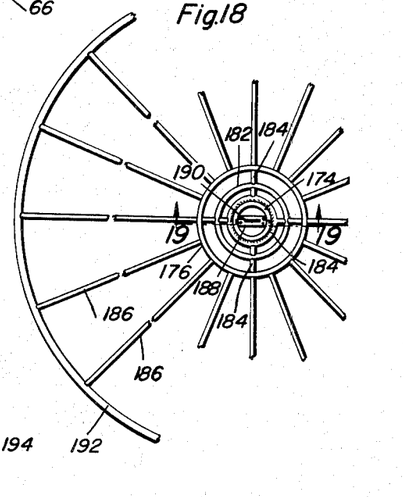
Figure 18 is an enlarged fragmentary top plan view of the drop net of Figure 16 with the net and net closing lines thereof being omitted for purposes of clarity.

Referring now to Figures 16, 17, 18 and 19 in particular, it will be seen that there is illustrated a modified form of drop net which is referred to in general by the reference numeral 170. The drop net 170 includes an upper rigid frame which is referred to in general by the reference numeral 172. The upper rigid frame 172 includes a central tubular member 174 and a concentric outer tubular member 176, the tubular members having their lower portions connected together by radiating webs 178. Disposed between the upper portions of the tubular members 174 and 176 are concentrically arranged rings 180 and 182, the ring 180 being disposed innermost and is secured to the upper part of the tubular member 174. The rings 180 and 182 are connected to each other and to the tubular member 176 by radiating webs 184 which are best illustrated in Figure 18. Extending outwardly from the tubular member 176 in circumferentially spaced radiating relation is a plurality of generally triangular trusses 186 which are best illustrated in Figure 16.

There is provided a bar 188 which extends between opposed portions of the tubular member 174. Secured to the bar 188 and extending upwardly therefrom is an eye forming member 190. The eye forming member 190 is preferably formed of rope and is identical to the eye forming rope member 92. Further, it is secured to the bar 188 in the identical manner as the rope member 92 is secured to the bar 94.

Overlying the rigid frame 172 and extending down over an outer ring member 192 connecting together the outer ends of the trusses 186 is a net 194 which may be of a composite construction as is shown in Figure 16. The lower part of the net 194 is connected together by a line 196 which has supported thereon for pivotal movement a plurality of the weights 68.

In order that the net 194 may be moved to its fish trapping closed position of Figure 17, there is guidingly engaged on the lifting line 32 the net control member 84, the net control member 84 being carried by the net control line 34. Secured to the net control ring 84 and depending therefrom is a plurality of net closing lines 198 which are suitably secured to the weights 68. The net closing lines 199 extend downwardly between the rings 180 and 182 and are guided thereby. Weight supporting lines 198 identical with the lines 83 also extend between the eyes 80 and the trusses 186.

In order to ensure the expanding of the lowermost part of the net 194 at all times, there is provided an expanding ring 200. The expanding ring 200 is of substantially the same diameter as the ring member 192 and is disposed within the confines of the net 194 between the net 194 and the net closing lines 198. When the drop net 170 is disposed in the water and the net control line 34 is tensioned to pull the net closing lines 198 through the rigid frame 172, the net control weights 68 move upwardly and towards each other, as viewed in Figure 17. However, the expanding ring 200 remains disposed within the net 194 and continues to expand that part of the net 194 which is disposed lowermost, as is best illustrated in Figure 17, so that the net forms a trap of a maximum size and at the same time, has a closed bottom. However, if desired lines 201 may be provided for lifting the expanding ring in unison with the weights 68.

Referring now to Figure 20 in particular, it will be seen that there is illustrated another modified form of drop net frame which is referred to in general by the reference numeral 202. The frame 202 includes an outer circular frame member 204 and a relatively small, inner circular frame member 206 which is concentric with the outer frame member 204. Extending radially between the frame members 206 and 204 are circumferentially spaced pairs of frame members 208. The frame members 208 of each pair are disposed in slightly spaced parallel relation and are intended to have guidingly received therebetween a line, such as the expanding ring lifting line 201.

It is the intention of this invention that the frame 202 be utilized in combination with a net assembly, such as that illustrated in Figure 17. There is to be secured to the frame a net, such as the net 60, with the net being controlled in its opening and closing movement by an expanding ring, such as the expanding ring 200. The lines 198 will extend down through the space between adjacent frame members 208 and be guided thereby. It is to be understood that the number of pairs of frame members 208 will depend directly upon the number of lines 198 to be used in conjunction with the net utilizing the frame 202. Inasmuch as the frame 202 is merely a replacement for the frame 172, further description of the structure and operation of the net incorporating the frame 202 is believed to be unnecessary.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A drop net assembly comprising a rigid upper frame, a net carried by said upper frame and depending therefrom, said upper frame and said net being of the same peripheral size, a net control ring overlying said upper frame, said net control ring having extending downwardly therefrom a plurality of net closing lines secured to a lower edge of said net in spaced relation, and a net control weight connected to each of said net closing lines, said weights being shaped to swing outwardly when said net assembly descends through water whereby said weights urge the lower portion of said net to an open state.

2. A drop net assembly comprising a rigid upper frame, a net carried by said upper frame and depending therefrom, a line extending about the lower portion of said net, said upper frame and said net being of the same peripheral size, a net control ring overlying said upper frame, said net control ring having extending downwardly therefrom a plurality of net closing lines secured to a lower edge of said net in spaced relation, and a net control weight connected to each of said net closing lines, said weights being shaped to swing outwardly when said net assembly descends through water whereby said weights urge the lower portion of said net to an open state, said weights being pivotally carried by said line extending about the lower portion of said net.

3. A drop net assembly comprising a rigid upper frame, a net carried by said upper frame and depending therefrom, a line extending about the lower portion of said net, said upper frame and said net being of the same peripheral size, a net control ring overlying said upper frame, said net control ring having extending downwardly therefrom a plurality of net closing lines secured to a lower edge of said net in spaced relation, and a net control weight connected to each of said net closing lines, said weights being shaped to swing outwardly when said net assembly descends through water whereby said weights urge the lower portion of said net to an open state, said weights being pivotally carried by said line extending about the lower portion of said net, said net closing lines being connected to top portions of said weights to control positioning of said weights.

4. A drop net assembly comprising a rigid upper frame, a net carried by said upper frame and depending therefrom, said upper frame and said net being of the same peripheral size, a net control ring overlying said upper frame, said net control ring having extending downwardly therefrom a plurality of net closing lines secured to a lower edge of said net in spaced relation, and a net control weight connected to each of said net closing lines, said weights being shaped to swing outwardly when said net assembly descends through water whereby said weights urge the lower portion of said net to an open state, said weights being generally rectangular in horizontal cross-section and decreasing downwardly in width, and said weights having convex inner surfaces and concave outer surfaces.

5. A drop net assembly comprising a rigid upper frame, a net carried by said upper frame and depending therefrom, said upper frame and said net being of the same peripheral size, a net control ring overlying said upper frame, said net control ring having extending downwardly therefrom a plurality of net closing lines secured to a lower edge of said net in spaced relation, and a net control weight connected to each of said net closing lines, said weights being shaped to swing outwardly when said net assembly descends through water whereby said weights urge the lower portion of said net to an open state, said weights being generally rectangular in horizontal cross-section and decreasing downwardly in width, and said weights having convex inner surfaces and concave outer surfaces, upper and lower ends of said weights being rounded.

6. A weight for weight controlled drop nets, said weight being reduced in width from the top to the bottom thereof, said weight having an inner convex surface and an outer concave surface the upper and lower ends of said weight being rounded, a single transverse bore in the upper portion of said weight to permit pivotal mounting thereof, and a fitting carried by the upper end of said weight for receiving a net closing line.

7. A weight for weight controlled drop nets, said weight being reduced in width from the top to the bottom thereof, said weight having an inner convex surface and an outer concave surface, the upper and lower ends of said weight being rounded, a single transverse bore in the upper portion of said weight to permit pivotal mounting thereof, and a fitting carried by the upper end of said weight for receiving a net closing line, said weight being rectangular in cross-section.

8. A drop net assembly comprising a rigid upper frame, a net carried by said upper frame and depending therefrom, said upper frame and said net being of the same peripheral size, a net control ring overlying said upper frame, said net control ring having extending downwardly therefrom a plurality of net closing lines secured to a lower edge of said net in spaced relation, a net control weight connected to each of said net closing lines, a lifting line attached to said upper frame, said net control ring being carried by said lifting line and affording a guide therefor, and a net control line attached to said net control ring.

9. A drop net assembly comprising a rigid upper frame, a net carried by said upper frame and depending therefrom, a net control ring overlying said upper frame, said net control ring having extending downwardly therefrom a plurality of net closing lines secured to a lower edge of said net in spaced relation, a net control weight connected to each of said closing lines, a rigid net expanding ring disposed within the lower portion of said net between said net and the lower portions of said net closing lines and supported thereby, said ring freely floating in said net for movement relative to said net as said net is moved to a closed position.

10. A drop net assembly comprising a rigid upper frame, a net carried by said upper frame and depending therefrom, a net control ring overlying said upper frame, said net control ring having extending downwardly therefrom a plurality of net closing lines secured to a lower edge of said net in spaced relation, a net control weight connected to each of said closing lines, said rigid frame including an elongated tubular member, a support ring carried by the upper end of said tubular member, radiating ribs pivotally carried by said support ring, a sleeve carried by said tubular member, braces extending between said sleeve and said ribs and pivotally connected thereto, said sleeve being slidable on said tubular member to permit folding of said ribs, and lock means fixedly connecting said sleeve to said tubular member to retain said ribs in extended positions.

11. A drop net assembly comprising a rigid upper frame, a net carried by said upper frame and depending therefrom, a net control ring overlying said uper frame, said net control ring having extending downwardly therefrom a plurality of net closing lines secured to a lower edge of said net in spaced relation, a net control weight connected to each of said closing lines, said rigid frame including an elongated tubular member, a support ring carried by the upper end of said tubular member, radiating ribs pivotally carried by said support ring, a sleeve carried by said tubular member, braces extending between said sleeve and said ribs and pivotally connected thereto, said sleeve being slidable on said tubular member to permit folding of said ribs, lock means fixedly connecting said sleeve to said tubular member to retain said ribs in extended positions, and a supporting stand for supporting said net in a folded state, said support stand including an upper end portion receivable in said tubular member to support said tubular member, and lock means carried by said stand for locking said tubular member to said stand.

12. A drop net assembly comprising a rigid upper frame, a net carried by said upper frame and depending therefrom, a net control ring overlying said upper frame, said net control ring having extending downwardly therefrom a plurality of net closing lines secured to a lower edge of said net in spaced relation, a net control weight connected to each of said closing lines, said rigid frame including an elongated tubular member, a support ring carried by the upper end of said tubular member, radiating ribs pivotally carried by said support ring, a sleeve carried by said tubular member, braces extending between said sleeve and said ribs and pivotally connected thereto, said sleeve being slidable on said tubular member to permit folding of said ribs, lock means fixedly connecting said sleeve to said tubular member to retain said ribs in extended positions, and a supporting stand for supporting said net in a folded state, said support stand including an upper end portion receivable in said tubular member to support said tubular member, lock means carried by said stand for locking said tubular member to said stand, and a net lifting line connected to said sleeve for lifting said net, said sleeve being slidable down over said stand when said ribs are in a folded state, said sleeve being movable relative to said tubular member by said lifting line.

13. A drop net assembly comprising a rigid upper frame, a net carried by said upper frame and depending therefrom, a net control ring overlying said upper frame, said net control ring having extending downwardly therefrom a plurality of net closing lines secured to a lower edge of said net in spaced relation, a net control weight connected to each of said closing lines, said rigid frame including an elongated tubular member, a support ring carried by the upper end of said tubular member, radiating ribs pivotally carried by said support ring, a sleeve carried by said tubular member, braces extending between said sleeve and said ribs and pivotally connected thereto, said sleeve being slidable on said tubular member to permit folding of said ribs, lock means fixedly connecting said sleeve to said tubular member to retain said ribs in extended positions, and a supporting stand for supporting said net in a folded state, said support stand including an upper end portion receivable in said tubular member to support said tubular member, lock means carried by said stand for locking said tubular member to said stand, and a net lifting line connected to said sleeve for lifting said net, said sleeve being slidable down over said stand when said ribs are in a folded state, said sleeve being movable relative to said tubular member by said lifting line, transverse rod disposed in said sleeve, said tubular member and said stand being provided with slots adapted to guide the movement of said rod thereby preventing rotation of said sleeve.

14. A drop net assembly comprising a rigid upper frame, a net carried by said upper frame and depending therefrom, a net control ring overlying said upper frame, said net control ring having extending downwardly therefrom a plurality of net closing lines secured to a lower edge of said net in spaced relation, a net control weight connected to each of said closing lines, said rigid frame including an elongated tubular member, a support ring carried by the upper end of said tubular member, radiating ribs pivotally carried by said support ring, a sleeve carried by said tubular member, braces extending between said sleeve and said ribs and pivotally connected thereto, said sleeve being slidable on said tubular member to permit folding of said ribs, lock means fixedly connecting said sleeve to said tubular member to retain said ribs in extended positions, and a supporting stand for supporting said net in a folded state, said support stand including an upper end portion receivable in said tubular member to support said tubular member, lock means carried by said stand for locking said tubular member to said stand, a net lifting line connected to said sleeve for lifting said net, said sleeve being slidable down over said stand when said ribs are in a folded state, said sleeve being movable relative to said tubular member by said lifting line, and means connected to said lifting line for automatically disengaging said lock means.

15. A drop net assembly comprising a rigid upper frame, a net carried by said upper frame and depending therefrom, a net control ring overlying said upper frame, said net control ring having extending downwardly therefrom a plurality of net closing lines secured to a lower edge of said net in spaced relation, a net control weight connected to each of said closing lines, said rigid frame including an elongated tubular member, a support ring carried by the upper end of said tubular member, radiating ribs pivotally carried by said support ring, a sleeve carried by said tubular member, braces extending between said sleeve and said ribs and pivotally connected thereto, said sleeve being slidable on said tubular member to permit folding of said ribs, lock means fixedly connecting said sleeve to said tubular member to retain said ribs in extended positions, and a supporting stand for supporting said net in a folded state, said support stand including an upper end portion receivable in said tubular member to support said tubular member, and lock means carried by said stand for locking said tubular member to said stand, said stand being pivotally mounted to permit lowering of said net.

References Cited in the file of this patent

UNITED STATES PATENTS

| | | |
|---|---|---|
| 796,709 | Cornet | Aug. 8, 1905 |
| 1,154,563 | Dorsey | Sept. 21, 1915 |
| 1,762,881 | Nicolayson | June 10, 1930 |
| 2,481,707 | Young | Sept. 13, 1949 |